US012009568B1

(12) United States Patent
Quarfoth et al.

(10) Patent No.: US 12,009,568 B1
(45) Date of Patent: Jun. 11, 2024

(54) THERMAL PROTECTION SYSTEM INCLUDING HIGH TEMPERATURE RADIO FREQUENCY APERTURE

(71) Applicant: HRL LABORATORIES, LLC, Malibu, CA (US)

(72) Inventors: Ryan Quarfoth, Malibu, CA (US); Walter Wall, Calabasas, CA (US); Shanying Cui, Malibu, CA (US); Christopher Roper, Malibu, CA (US); Jonathan Lynch, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 713 days.

(21) Appl. No.: 17/031,254

(22) Filed: Sep. 24, 2020

Related U.S. Application Data

(60) Provisional application No. 62/992,471, filed on Mar. 20, 2020.

(51) Int. Cl.
| *H01Q 1/02* | (2006.01) |
| *B64G 1/58* | (2006.01) |
| *G01S 13/90* | (2006.01) |
| *H01Q 1/00* | (2006.01) |
| *H01Q 21/06* | (2006.01) |
| *H01Q 1/28* | (2006.01) |

(52) U.S. Cl.
CPC ............... *H01Q 1/02* (2013.01); *B64G 1/58* (2013.01); *G01S 13/9094* (2013.01); *H01Q 1/002* (2013.01); *H01Q 21/064* (2013.01); *H01Q 1/286* (2013.01)

(58) Field of Classification Search
CPC ...... H01Q 21/064; H01Q 1/286; H01Q 1/422; H01Q 1/00; H01Q 1/02; B64G 1/58; G01S 13/90
See application file for complete search history.

(56) References Cited

U.S. PATENT DOCUMENTS

| 3,310,808 | A | * | 3/1967 | Friis | ....................... | H01Q 1/425 |
| | | | | | | 343/872 |
| 3,334,349 | A | * | 8/1967 | Wheeler | ................ | H01Q 1/425 |
| | | | | | | 333/33 |
| 3,448,455 | A | * | 6/1969 | Alfandari | ............. | H01Q 19/195 |
| | | | | | | 343/756 |
| 3,633,206 | A | * | 1/1972 | McMillan | .......... | H01Q 15/0026 |
| | | | | | | 343/781 R |
| 4,570,166 | A | * | 2/1986 | Kuhn | ..................... | H01Q 1/425 |
| | | | | | | 343/872 |
| 4,677,443 | A | * | 6/1987 | Koetje | .................... | H01Q 1/422 |
| | | | | | | 343/872 |
| 7,817,100 | B2 | * | 10/2010 | Navarro | ................. | H01Q 1/002 |
| | | | | | | 343/872 |

(Continued)

FOREIGN PATENT DOCUMENTS

FR 3001342 A1 * 7/2014 ............. H01Q 13/06

*Primary Examiner* — Benjamin P Lee
(74) *Attorney, Agent, or Firm* — Lewis Roca Rothgerber Christie LLP

(57) ABSTRACT

A thermal protection system includes: an outer skin; a thermally insulating material under the outer skin; and a high temperature radio frequency (RF) aperture. The RF aperture includes a plurality of waveguides separated from each other and extending through the outer skin and the thermally insulating material.

19 Claims, 6 Drawing Sheets

(56) References Cited

U.S. PATENT DOCUMENTS

| | | | | |
|---|---|---|---|---|
| 8,378,904 | B1* | 2/2013 | Colich | H01Q 1/02 |
| | | | | 343/705 |
| 8,736,502 | B1* | 5/2014 | Langfield | H01Q 1/286 |
| | | | | 343/753 |
| 8,765,230 | B1* | 7/2014 | Waldrop, III | H01Q 1/02 |
| | | | | 343/872 |
| 10,122,078 | B2* | 11/2018 | Hutcheson | H01Q 9/0492 |
| 10,153,547 | B2* | 12/2018 | Crouch | H01Q 1/425 |
| 10,784,571 | B2* | 9/2020 | Crouch | H01Q 1/42 |
| 11,367,948 | B2* | 6/2022 | Jordan | H01Q 1/422 |
| 11,616,302 | B2* | 3/2023 | George | H01Q 19/18 |
| | | | | 343/837 |
| 2008/0122725 | A1* | 5/2008 | Navarro | H01Q 1/002 |
| | | | | 343/872 |
| 2018/0062727 | A1* | 3/2018 | Savage | H01Q 19/062 |
| 2018/0094909 | A1* | 4/2018 | Crouch | F41H 5/0457 |
| 2018/0212317 | A1* | 7/2018 | Hutcheson | H01Q 1/422 |
| 2022/0263235 | A1* | 8/2022 | Flavin | B64C 1/38 |

* cited by examiner

THERMAL PROTECTION SYSTEM INCLUDING HIGH TEMPERATURE RADIO FREQUENCY APERTURE

CROSS-REFERENCE TO RELATED APPLICATION

The present application claims priority to and the benefit of U.S. Provisional Patent Application Ser. No. 62/992,471, filed on Mar. 20, 2020, the entire content of which is incorporated herein by reference.

BACKGROUND

1. Field

One or more aspects of embodiments of the present disclosure are directed to a thermal protection system including a high temperature radio frequency (RF) aperture and a method of manufacturing the thermal protection system including the RF aperture.

2. Related Art

Extremely high speed vehicles and weapons (collectively referred to herein as "vehicles") are considered to be the future of travel and warfare. Extremely high speeds may include hypersonic speeds (e.g., speeds of Mach 5 or greater) but, as used herein, may also indicate high supersonic speeds (e.g., speeds of Mach 3 or greater). Technical challenges faced in developing reliable extremely high speed vehicles include navigation, object avoidance, and, in the case of weapons, targeting and terminal guidance.

In the related art, radar is often used for navigation and object detection and avoidance and targeting (e.g., object detection, tracking, and terminal guidance). Radar systems emit radio waves (e.g., electromagnetic radiation) having certain frequencies (collectively, "radio frequencies" or "RF") from an antenna and then measures any return of the emitted RF signals, which indicates the presence of an object, weather, etc. depending on how the radar system is configured.

Generally, vehicles, especially high speed vehicles, such as aircraft and missiles, include an outer skin, often formed of a metal material, such as aluminum or a carbon fiber composite (as in the Boeing 787). The outer skin must retain its structural integrity under various environments, but the outer skin may severely attenuate (e.g., weaken) RF signals as they pass through. Thus, vehicles generally include a radome covering the radar antenna instead of the metallic or carbon fiber composite outer skin. The radome is made of a material that does not substantially attenuate RF signals (e.g., is RF transparent) but protects the radar antenna from the elements (e.g., heat, water, sunlight, bird strikes, etc.) experienced by the vehicle and acts as a part of the outer skin of the vehicle.

However, related art radome materials and the integration of radome materials with the outer skin materials are not suitable for extremely high speed vehicles (e.g., hypersonic vehicles). For example, related art radome materials, such as fiberglass, etc., are not suitable for the high skin temperatures experienced by extremely high speed vehicles (e.g., over 1,200° C.), and surface discontinuities between the different outer skin materials (e.g., the primary outer skin of the vehicle compared with the radome material) may cause increased aerothermal heating, stress concentrations, ablation, etc. that reduce the ability of the vehicle to maintain extremely high speeds for an appreciable amount of time or simply reduce the ability of the vehicle to reach extremely high speeds at all.

SUMMARY

Aspects of embodiments of the present disclosure are directed toward a thermal protection system including a high temperature radio frequency (RF) aperture, a method of manufacturing the thermal protection system including the RF aperture, and a hypersonic vehicle including the same. The thermal protection system, according to an embodiment, includes an RF aperture including an array of openings (e.g., holes) in (or extending through) layers of the thermal protection system. The openings may extend through an outer skin and one or more underlaying insulating layers of the thermal protection system. The openings are coated with a coating layer, and an open center of the coating layers are filled with a high temperature dielectric filler to form an array of waveguides. The waveguides feed an RF transceiver arranged behind the thermal protection system (e.g., inside the vehicle) to provide, for example, radar coverage in front of (e.g., along a traveling direction) of the vehicle.

Because the RF aperture includes an array of small openings in the outer layer of the thermal protection system (e.g., the outer skin of the vehicle), and because the openings are filled by a high temperature dielectric filler, the structural integrity of the thermal protection system and the vehicle is not substantially reduced, such that extremely high speed travel (e.g., hypersonic travel) may be maintained for extended periods of time.

According to an embodiment of the present disclosure, a thermal protection system includes: an outer skin; a thermally insulating material under the outer skin; and a high temperature radio frequency (RF) aperture. The RF aperture includes a plurality of waveguides separated from each other and extending through the outer skin and the thermally insulating material.

Each of the waveguides may include a dielectric filler and a coating layer surrounding a periphery of the dielectric filler.

Each of the waveguides may have a base portion and an impedance transition portion. The base portion may have a smaller width or diameter than that of the impedance transition portion.

The impedance transition portion may open to an outer surface of the outer skin, and the base portion may open to an inner surface of the thermally insulating material.

A transition between the impedance transition portion and the base portion may be within the outer skin.

A transition between the impedance transition portion and the base portion may be at where the outer skin and the thermally insulating material contact each other.

The thermal protection system may further include a capping layer on the waveguides and on the outer skin.

The outer skin may have a recessed portion into which the capping layer is arranged.

The capping layer may be composed of a same material as the outer skin.

The thermal protection system may further include a metal layer under the thermally insulation material.

The metal layer may have a plurality of openings therein respectively aligned with the waveguides.

Each of the waveguides may include a dielectric filler and a coating layer surrounding a periphery of the dielectric filler, and the openings in the metal layer may have a diameter or width corresponding to a diameter or width of the dielectric filler and smaller than a diameter or width of the coating layer.

According to an embodiment of the present disclosure, a hypersonic vehicle includes a thermal protection system as described above and a radar system. The radar system includes an RF transceiver and an input coupling layer. The input coupling layer connects the RF transceiver to at least some of the waveguides of the thermal protection system.

The radar system may be an electronically scanned array radar system.

According to an embodiment of the present disclosure, a method of manufacturing a thermal protection system including a high temperature radio frequency (RF) aperture includes: forming a plurality of openings in an outer skin; forming a plurality of openings in a thermally insulating material; and forming waveguides in the openings in the outer skin and in the openings in the thermally insulating material. The waveguides continually extend through the outer skin and the thermally insulating material.

The method may further include arranging the thermally insulating material under the outer skin prior to the forming of the openings in the outer skin and the forming of the openings in the thermally insulating material.

The forming of the waveguides may include: forming a coating layer on an inner surface of the openings in the outer skin and in the openings in the thermally insulating material; and forming a dielectric filler in openings in the coating layers.

The forming of the waveguides may include: forming a dielectric filler; coating the dielectric filler with a coating layer to form waveguides; and inserting the waveguides into the openings in the outer skin and into the openings in the thermally insulating material.

The forming of the openings in the outer skin may include: drilling an array of first openings in the outer skin; and re-drilling the first openings in the outer skin to form an array of second openings having a greater diameter or width than the first openings.

The drilling the array of first openings in the outer skin may include drilling entirely through the outer skin, and the re-drilling of the first openings in the outer skin may include re-drilling to a depth of the outer skin less than a total thickness of the outer skin.

BRIEF DESCRIPTION OF THE DRAWINGS

These and other aspects and features of the present disclosure will be further appreciated and better understood with reference to the specification, claims, and appended drawings, in which:

DETAILED DESCRIPTION

Figure 1:
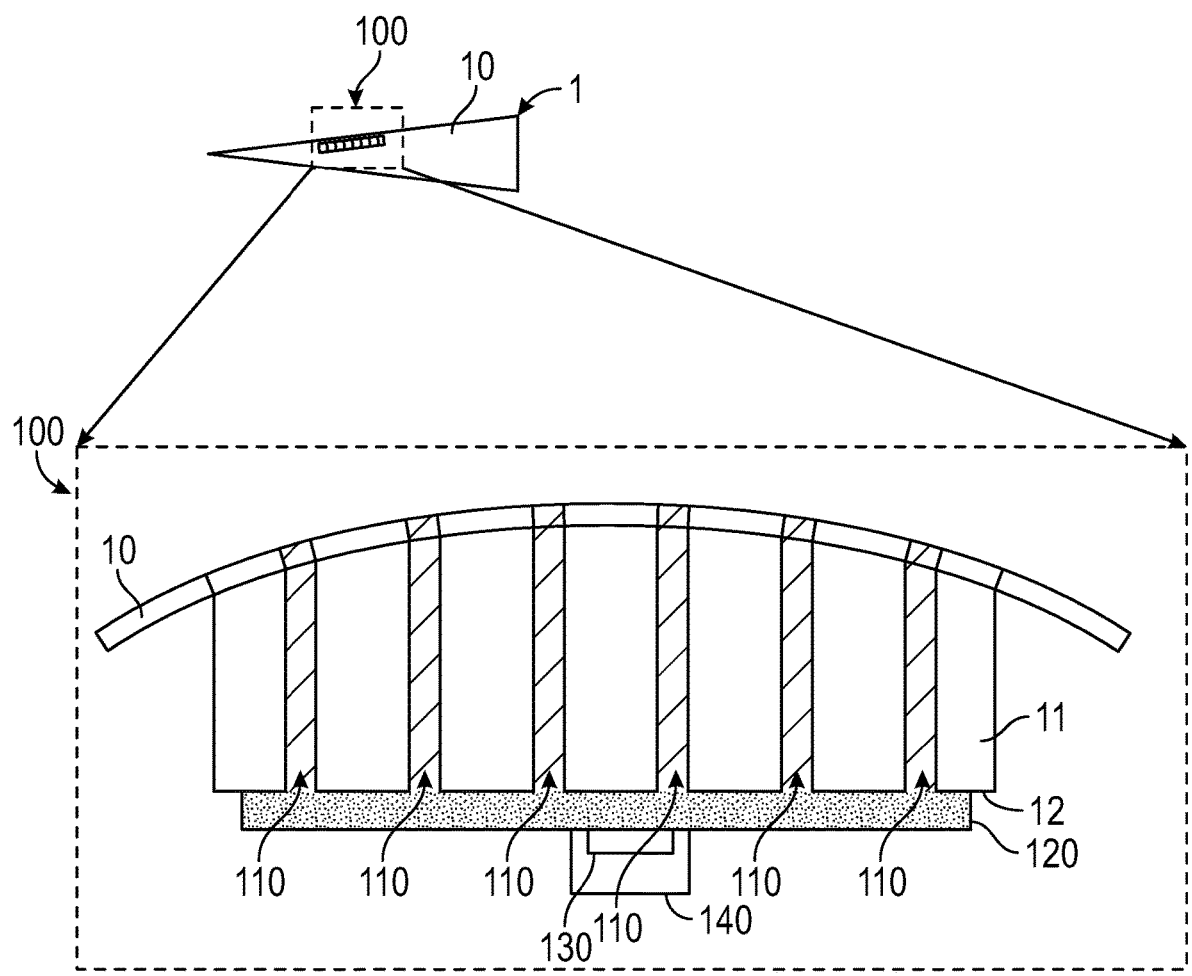
FIG. 1 is a schematic view of a vehicle including a thermal protection system including a high temperature radio frequency (RF) aperture and a close-up, cross-sectional view of the thermal protection system including the high temperature RF aperture according to an embodiment of the present disclosure.

The detailed description set forth below, in connection with the appended drawings, is intended as a description of example embodiments of the present disclosure and is not intended to represent the only forms in which the present disclosure may be embodied. The description sets forth aspects and features of the present disclosure in connection with the illustrated example embodiments. It is to be understood, however, that the same or equivalent aspects and features may be accomplished by different embodiments, and such other embodiments are encompassed within the spirit and scope of the present disclosure. Like reference numerals in the description and the drawings are intended to indicate like elements, and similar reference numbers in the description and the drawings are intended to indicate similar elements. Further, descriptions of features, configurations, and/or other aspects within each embodiment should typically be considered as available for other similar features, configurations, and/or aspects in other embodiments.

In the related art, a vehicle (e.g., a hypersonic vehicle) includes a thermal protection system that protects internal components from the high temperatures experienced during high speed travel. In the related art, the thermal protection system includes a radio frequency (RF) transparent window to protect an underlying radar system (e.g., an electronically scanned array (ESA) radar system or antenna, etc.), similar to a how a radome protects a radar system (e.g., a radar antenna) in slower vehicles, such as passenger aircraft. Generally, the RF window is provided at or near a front of the vehicle so the radar system emits RF signals, and therefore detects objects, in front of (e.g., along a traveling path) of the vehicle, where it is subjected to extremely high thermal and mechanical stresses. Related art RF windows are transparent (e.g., transparent or substantially transparent to the RF frequency emitted by the radar system), but suitable RF window materials generally do not maintain sufficient strength at or above about 1,200° C. Further, the RF windows have a different material composition than an outer skin of the thermal protection system of the vehicle, resulting in local variations in erosion and/or ablation characteristics, which can lead to abnormal or increased aerothermal heating due to surface discontinuities, increased thermo-mechanical loads, and possible failure of the vehicle. Because hypersonic vehicles experience extremely high structural forces and loads and experience high surface temperatures, related art RF windows are not well suited to hypersonic vehicles and the like.

FIG. 1 shows a vehicle 1 including a thermal protection system (TPS), of which an outer skin 10 is visible, and a high temperature radio frequency (RF) aperture 100 in the thermal protection system. The vehicle 1 may be a hypersonic vehicle (e.g., a hypersonic transport vehicle, space plane, hypersonic missile, etc.). The present disclosure is not, however, limited to hypersonic vehicles and may applied to other vehicles, such as supersonic vehicles, etc.

The outer skin 10 is an outermost layer of the vehicle's 1 thermal protection system (TPS) and, in some embodiments, may also be an outermost layer of the vehicle 1. The outer skin 10 may be formed of (or may include), as some examples, a carbon-carbon composite, a carbon-silicon carbide (SiC) composite, a SiC—SiC composite, an oxide-oxide composite, or a ceramic matrix composite. However, other suitable high temperature compatible materials may be used as (or may be included in) the outer skin 10. The outer skin 10 may have a thickness of about 1 inch, but this is merely an example. The thickness and material of the outer skin 10 may be determined based on a variety of factors, including the anticipated flight profile of the vehicle 1, anticipated mechanical forces to be experienced by the vehicle 1, reusability of the vehicle 1, etc.

Figure 2A:
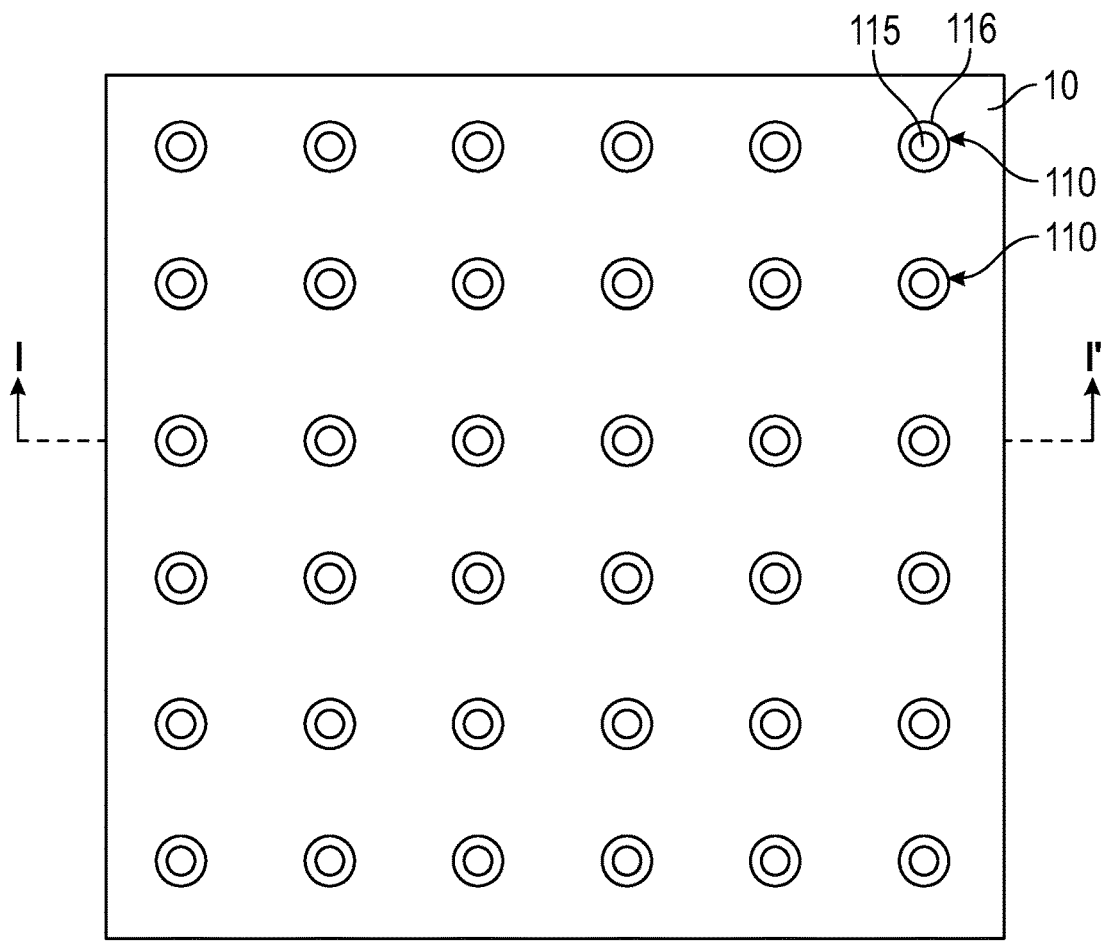
FIG. 2A is a top-down view of a thermal protection system including a high temperature RF aperture according to an embodiment of the present disclosure.
Figure 2B:
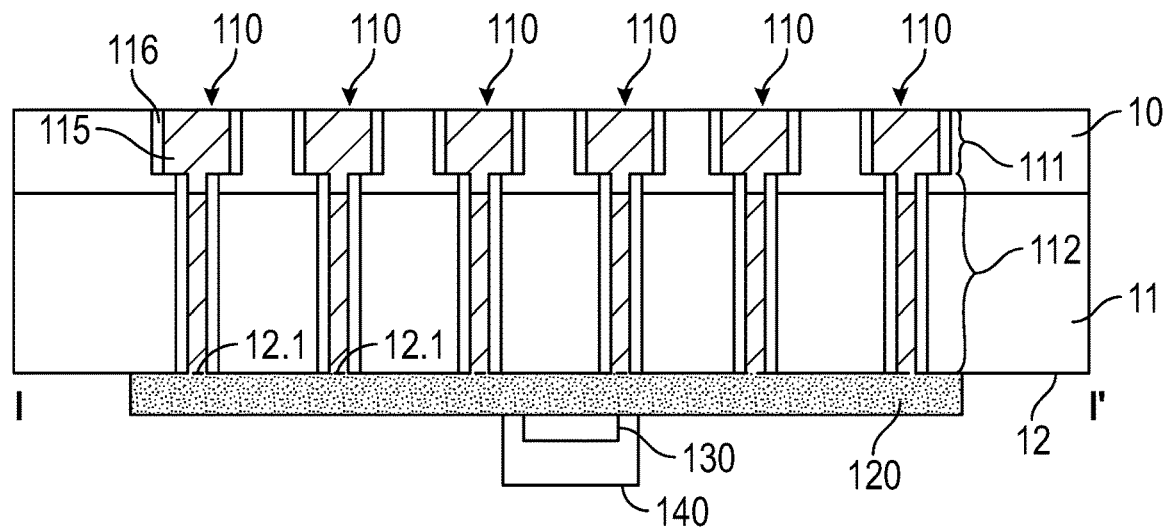
FIG. 2B is a cross-sectional view taken along the line I-I' of FIG. 2A.

The vehicle's 1 TPS further includes a high temperature thermally insulating material 11 behind (or under) the outer skin 10 (e.g., inside the vehicle 1) (see, e.g., FIG. 2B). The thermally insulating material 11 may include (or may be formed of) a high temperature porous carbon insulation, such as Min-K® (a registered trademark of Morgan Crucible Company Plc, in Windsor, Berkshire, England) or CalCarb® (a registered trademark of Mersen Scotland Holytown Ltd., in Holytown, United Kingdom). The thermally insulating material 11 may have a thickness in a range of about 1 inch to about 3 inches, but this is merely an example. The thickness of the thermally insulating material 11 may be determined based on the available space in the vehicle 1, anticipated thermal loads, etc.

In some embodiments, the insulator 11 may include a plurality of layers (e.g., may have a multi-layer structure). For example, depending on the anticipated temperature the vehicle 1 may experience and/or the insulation needs of the vehicle 1, the insulating 11 may include a higher temperature tolerant material near the surface with a lower temperature tolerant but better insulator material below the higher-temperature tolerant material.

The TPS system may further include a metal layer 12 under the thermally insulating material 11 to hold it in place (e.g., the metal layers 12 and the outer skin 10 may sandwich the thermally insulating material 11) (see, e.g., FIG. 2B). The metal layer 12 may be formed of (or may include) copper, gold, or silver as some examples. The metal layer 12 may be an innermost layer of the TPS, but in other embodiments, the TPS may include more than the three layers 10, 11, 12.

Generally, the layers 10, 11, 12 of the TPS have poor RF transmittance, and as these (and possibly other) layers 10, 11, 12 of the TPS are heated during high speed (e.g., hypersonic) travel, significant noise will be added to any RF signals emitted or received through the TPS. Accordingly, the TPS includes the RF aperture 100 according to embodiments of the present disclosure to allow RF transmission through the TPS (e.g., through the layers 10, 11, 12) with minimal loss while maintaining the structural integrity of the TPS and the vehicle 1 at extremely high speeds, high surface temperatures, and high mechanical stresses.

The location of the RF aperture 100 on the vehicle 1 shown in FIG. 1 is only provided as an example, and the RF aperture 100 may be provided at any suitable location on the vehicle 1. However, as objects in front of the vehicle 1 (e.g., along a traveling path of the vehicle 1) are most important for navigation, object avoidance, targeting, terminal guidance, etc., the RF aperture 100 will often be located at or near a front (or leading edge) of the vehicle 1, where it will experience high thermal and aero-mechanical loading.

Further, the shape of the vehicle 1 shown in FIG. 1 is only provided as an example, and embodiments of the RF aperture 100 may be provided to variously-shaped high speed and extremely high speed vehicles or the like.

A radar system (e.g., an electronically scanned array (ESA) radar) or the like may be provided in the vehicle 1 behind the RF aperture 100 (e.g., the radar system may emit radio frequencies through the RF aperture 100) in the TPS, similar to a radome.

As described in more detail below, by forming the TPS with the RF aperture 100, low RF loss is achievable through the TPS without substantially impacting the ability of the TPS to withstand high temperatures and aero-mechanical loads encountered during high speed travel. Thus, different from related art TPS systems that include an RF window, the TPS including the RF aperture 100 according to embodiments of the present disclosure can be applied to hypersonic vehicles and the like that experience extremely high temperatures (e.g., extremely high surface temperatures).

According to an embodiment of the present disclosure, the RF aperture 100 includes a plurality of waveguides 110 extending through the TPS (e.g., through the thermally insulating material 11 and the outer skin 10 and terminating at or in a corresponding opening 12.1 in the metal layer 12) of the vehicle 1. A proximal end of the waveguides 110 opens to the input coupling layer 120 (described in more detail with reference to FIGS. 5-7) through the openings 12.1 in the metal layer 12, and a distal end of the waveguides 110 opens (e.g., is exposed) outside the vehicle 1 through the outer skin 10. The RF transceiver 130 may be connected to the input coupling layer 120 to generate and transmit RF signals through the waveguides 110 via the input coupling layer 120 and to receive and process reflected RF signals through the waveguides 110 via the input coupling layer 120. A radar system, according to an embodiment, may include the RF transceiver 130, the input coupling layer 120, and the waveguides 110.

The RF transceiver 130 may be housed in an insulated and/or cooled enclosure 140 so it remains at a suitable temperature while being relatively close to the heated TPS of the vehicle 1.

FIG. 2A is a top-down schematic view of the TPS including the RF aperture 100 according to an embodiment of the present disclosure, and FIG. 2B is a cross-sectional view taken along the line I-I' of FIG. 2A.

Referring to FIGS. 2A and 2B, the TPS includes the RF aperture 100 including the waveguides 110. The distal ends of the waveguides 110 are open to the exterior of the vehicle 1 and extend through openings in the outer skin 10 and the thermally insulating material 11 to terminate at (or in) the openings 12.1 in the metal layer 12. The openings 12.1 in the metal layer 12 may have a diameter or width corresponding to a diameter of width of the dielectric filler 115 and smaller than a diameter or width of the coating layer 116. For convenience of illustration, only some of the openings 12.1 in the metal layer 12 are labeled in the drawings, but each waveguide 110 terminates at (or in) a corresponding opening 12.1 in the metal layer 12.

In one embodiment, the openings in the TPS layers 10, 11, 12 may be drilled, for example, mechanically drilled, laser drilled, water jet drilled, and/or electro-discharge machined, after the TPS layers 10, 11, 12 are combined with each other. In other embodiments, each of the TPS layers 10, 11, 12 may be formed with openings therein (e.g., by drilling) and then stacked on each other such that corresponding openings in each layer 10, 11, 12 are aligned.

The openings in the TPS layers 10, 11, 12 and the corresponding waveguides 110 formed in each of the openings therein are provided at regular intervals (e.g., in a repeating pattern). For example, as shown in FIG. 2A, the waveguides 110 may be arranged in a matrix form in which the waveguides 110 are adjacent each other in two directions.

The spacing between the adjacent waveguides 110 may be determined based on an operation frequency of the radar system and/or the field of view of the radar system (e.g., a frequency of the RF signals emitted and received by the RF transceiver 130). To achieve grating lobe free scanning at an operating RF signal wavelength of λ and up to a maximum beam scan angle of θ with respect to the line of the RF aperture 100 (e.g., a direction normal to the RF aperture 100), the waveguide 110 spacing may be determined according to Equation 1:

$$\lambda/(1 + |\cos\theta|) \quad \text{[Equation 1]}$$

In an example, when the operating RF frequency is 30 Ghz, the waveguides 110 may be spaced apart from each other by about 5 mm in both directions.

To reduce the occurrence of (or to prevent) excitation of higher order modes in the waveguides 110, a radius (or diameter) of each waveguide 110 (or a width in the case of rectangular waveguides 110) is set such that the frequency of operation is above the cutoff frequency for the lowest order mode but below the cutoff frequency of any other mode. For example, the lower cutoff frequency ($F_c$) may be determined according to Equation 2:

$$F_c = 1.8412 * c/(2 * \pi * r * n) \quad \text{[Equation 2]}$$

wherein c is the speed of light, r is the radius of the waveguide 110, and n is the index of the dielectric filler 115 in the waveguide 110. The upper frequency cutoff may be about twice the lower cutoff frequency.

In one embodiment, each of the waveguides 110 may have a diameter in a range of about 1 to about 3 mm depending on the dielectric constant of the waveguide.

For convenience, one waveguide 110 will be described below, but the configuration of the one waveguide 110 described herein may be applicable to all of the waveguides 110 (e.g., all of the waveguides 110 may have the same or substantially the same configuration). Referring to FIG. 2B, the waveguide 110 has a base portion 112 and an impedance transition portion (e.g., an impedance transition) 111. The impedance transition portion 111 improves the return loss and radiation efficiency of the waveguide 110. The base portion 112 of the waveguide 110 has a smaller diameter (or width) than the impedance transition portion 111 of the waveguide 110 and is near the distal end of the waveguide 110 (e.g., near the input coupling layer 120). The base portion 112 of the waveguide 110 opens to the input coupling layer 120 via the opening 12.1 in the metal layer 12. The impedance transition portion 111 is near the distal end of the waveguide 110 and opens through the outer skin 10 of the vehicle 1.

In FIG. 2B, a transition between the impedance transition portion 111 and the base portion 112 is within (or occurs within) the outer skin 10, but the present disclosure is not limited thereto. In another embodiment, the impedance transition portion 111 of the waveguide 110 may extend the entire thickness of the outer skin 10, and the base portion 112 of the waveguide 110 may extend the entire thickness of the thermally insulating material 11. In such an embodiment, the transition between the base portion 112 and the impedance transition portion 111 is at where the thermally insulating material 11 contacts the outer skin 10. In another embodiment, the transition between the impedance transition portion 111 and the base portion 112 may be within the thermally insulating material 11 (e.g., a length of the impedance transition portion 111 may be greater than a thickness of the outer skin 10).

The impedance transition portion 111 may be formed by re-drilling or countersinking a portion of the opening in which the waveguide 110 is formed but before the materials of the waveguide 110 are placed therein. Different from the step-difference between the base portion 112 and the impedance transition portion 111 shown in FIG. 2B, in other embodiments, the waveguide 110 may have a taper shape (which could be a linear taper or another suitable taper shape) or may be stepped (e.g., the waveguide 110 may include additional impedance transition portions, each having a different diameter or width).

When the waveguide 110 is configured for narrowband operation, the impedance transition portion 111 may include a quarter wave transformer. When the waveguide 110 is configured for wideband operation, the impedance transition portion 111 may include a multi-step transformer, such as a binomial or Chebyshev design, or a continuous transformer, such as an exponential or Klopfenstein taper.

The waveguide 110 includes a dielectric filler 115 and a coating layer 116 around (or surrounding) a periphery of the dielectric filler 115. For example, the coating layer 116 may coat the openings in the outer skin 10 and in the thermally insulating material 11, and the dielectric filler 115 may fill an opening in the coating layer 116.

The coating layer 116 may be (or may include) a thin layer of high temperature electrically conductive material, such as tungsten, molybdenum, tantalum, niobium, rhodium, and/or platinum, suitable diborides, such as zirconium diboride, carbides, or nitrides that are electrically conductive at elevated temperatures. The coating layer 116 may have a thickness in a range of about 1 μm to about 500 μm (e.g., a thickness less than about 500 μm, less than about 100 μm, less than about 50 μm, less than about 10 μm, or less than about 1 μm). The material of the coating layer 116 may be chemically, optically, and/or mechanically polished after emplacement (e.g., after deposition, insertion, etc.). The thickness of the coating layer 116 may be thicker than the electromagnetic skin depth at the operation frequency of the RF transceiver 130 and thick enough to provide some bending rigidity and strength to the waveguide 110 (e.g., to the dielectric filler 115 of the waveguide 110) but may otherwise be as thin as possible to reduce (or minimize) thermal conduction from the hot outer skin 10 and thermally insulative material 11 to the waveguide 110, the input coupling layer 120, and the RF transceiver 130.

In some embodiments, the material of the coating layer 116 and/or the dielectric filler 115 may vary along a length of the waveguide 110. For example, the coating layer 116 may include (e.g., may consist of or primarily include) tungsten near the hotter outer skin 10 (e.g., near or at the distal end of the waveguide 110) and may transition to copper along the length of the waveguide 110 toward the proximal end (e.g., toward the cooler, inner side) to further reduce RF loss.

The opening within the coating layer 116 is filled with the dielectric filler 115, which may be (or may include) a high temperature dielectric, such as boron nitride, hafnium oxide, hafnium silicate, zirconium oxide, aluminum oxide, celsian (e.g., barium aluminosilicate), etc. The dielectric filler 115 may have low thermal conductivity. In some embodiments, the thermal conductivity of the dielectric filler 115 may increase toward a center thereof (e.g., toward a center in a radial (or width) direction thereof).

The waveguide 110 may be formed by, for example, coating an electrically conductive material on the inside of (e.g., on the inner or exposed surface of) the openings in the outer skin 10 and the thermally insulating material 11 to form the coating layer 116 and by then adding (e.g., depositing, filling, etc.) the dielectric filler 115 into the opening in the coating layer 116. In other embodiments, the dielectric filler 115 may be separately formed (e.g., formed separate from the TPS layers 10, 11, 12), clad with the coating layer 116, and then inserted in the openings in the TPS layers 10, 11 as a unit. For example, the dielectric filler 115 may be formed as a dielectric rod (e.g., a rod having a circular or rectangular cross-section) by sintering powder and, in some embodiments, a binder as well, and then coating the dielectric rod with the electrically conductive material to form the coating layer 116 around the dielectric filler 115. In some embodiments, instead of sintering each dielectric rod, dielectric cores may be cut from a larger billet of dielectric material to form the dielectric fillers 115. In some embodiments, the dielectric filler 115 may be formed by pyrolysis of a pre-ceramic polymer (e.g., a pre-ceramic polymer including solid particle, whisker, and/or fiber inclusions), polished (e.g., mechanically polished) to yield a smooth surface, and then coated with the electrically conductive material to form the coating layer 116 therearound. In any of the above-described embodiments, the coating layer 116 may be formed (or applied) by using, for example, electroplating, electroless plating, chemical vapor deposition, physical vapor deposition, plasma spray, etc.

In other embodiments, the coating layer 116 may be formed, filled with the dielectric filler 115, and then the coating layer 116 with the dielectric filler 115 therein may be inserted into the openings in the TPS layers 10, 11. In other embodiments, the coating layer 116 may be partially formed, then the dielectric filler 115 may be added into the partially-formed coating layer 116, and then the remainder of the coating layer 116 may be added before the completed waveguide 110 is inserted the openings in the TPS layers 10, 11.

In an embodiment in which the waveguide 110 is formed outside of the openings in the TPS layers 10, 11, the waveguide 110 may be sized to have an interference fit with (e.g., may be sized to be slightly larger than) the openings in the TPS layers 10, 11, 12, thereby preventing a gap between the TPS layers 10, 11 and the waveguide 110 and preventing the waveguide 110 from being pushed through the opening 12.1 in the metal layer 12. In other such embodiments, an annular gap may be present between the waveguide 110 and the openings in the TPS layers 10, 11 after the waveguide 110 is inserted thereinto, which may be filled due to a coefficient of thermal expansion mismatch between the materials of the waveguide 110 and the TPS layers 10, 11, such that the size (e.g., the diameter or width) of the waveguide 110 increases to fill the annular gap during use. In yet other such embodiments, a material may be deposited in the annular gap, and the material may be similar to or may be a composite formed by, for example, pyrolysis of a preceramic polymer, or a carbon-forming polymer, or chemical vapor deposition (CVD), or may be a conductive material formed by, for example, CVD, plasma spray, electroplating, electroless plating, etc.

Figure 3:
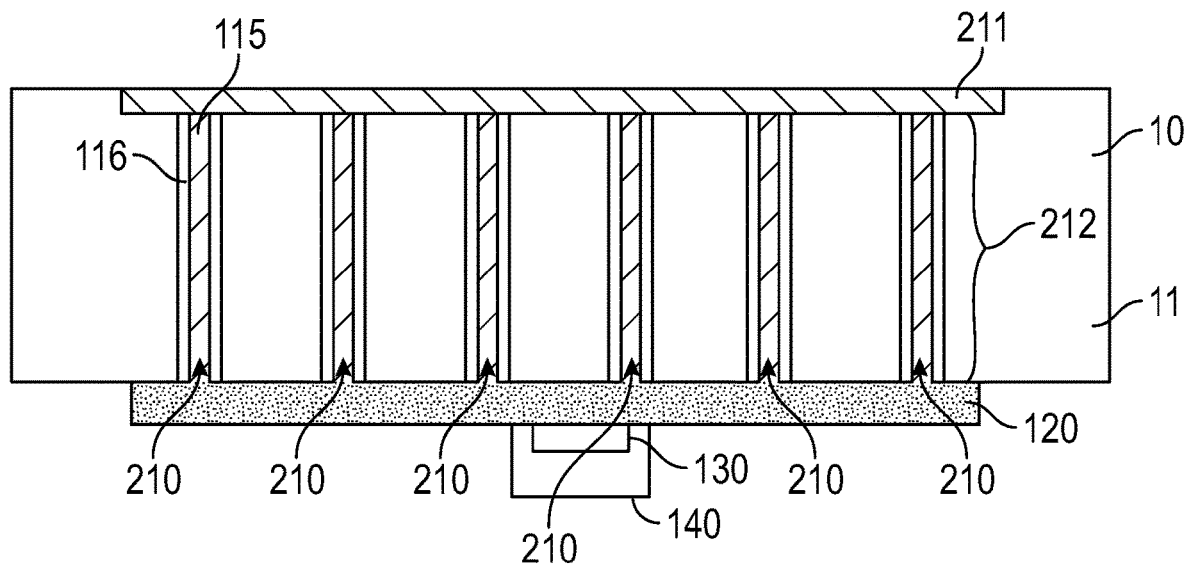
FIG. 3 is a cross-sectional view of the thermal protection system including a high temperature RF aperture according to another embodiment of the present disclosure.
Figure 4:
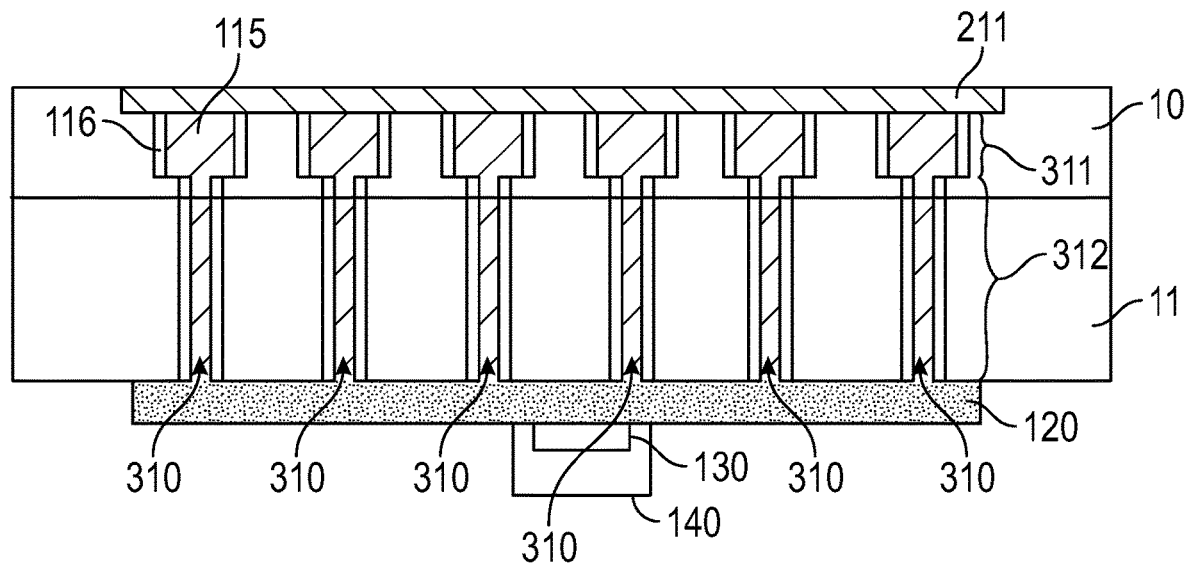
FIG. 4 is a cross-sectional view of the thermal protection system including a high temperature RF aperture according to another embodiment of the present disclosure.

FIGS. 3 and 4 show waveguides according to other embodiments of the present disclosure. Referring to FIG. 3, the waveguides 210 only have a base portion 212 (e.g., the waveguides 210 omit the impedance transition portion 111). For example, the waveguides 210 have a consistent or substantially consistent diameter (or width) between their proximal and distal ends. In FIG. 3, the TPS further includes a capping layer 211 over the distal ends of the waveguides 210. The capping layer 211 may have a thickness in a range of about 0.2 mm to about 0.5 mm and may be formed of (or may include) a high temperature dielectric material, such as boron nitride, hafnium silicate, hafnium oxide, etc., a high temperature composite, such as a carbon-carbon composite, a carbon-SiC composite, a SiC—SiC composite, etc., and/or an oxidation resistant coating, such as hafnium carbide-carbon/SiC or iridium oxide. The capping layer 211 may be provided in a recessed portion of the outer skin 10 so that a smooth outer surface is provided, thereby reducing aero-thermal heating of the vehicle 1 during flight. While the capping layer 211 is shown as being a continuous layer covering all of the waveguides 210, the present disclosure is not limited thereto. In other embodiments, a plurality of capping layers may be discretely (or separately) formed over each of the waveguides 210.

Referring to FIG. 4, the waveguides 310 each include an impedance transition portion 311 and a base portion 312, substantially similar to the waveguides 110 shown in FIG. 2B, and the TPS also includes the capping layer 211 as shown in FIG. 3 and described above. In this way, it is to be made clear the aspects and features of the various embodiments described herein are generally available for or to replace similar aspects and features in other embodiments.

Because the outer skin 10 is substantially intact (e.g., only has an array of small openings in which the waveguides 110, 210, 310 are formed), and because the waveguides 110, 210, 310 are formed of high temperature compatible materials, the RF aperture 100 does not substantially impact the structural integrity of the TPS or the vehicle 1 and allows for sustained high speed travel and high surface (or skin) temperatures. Further, when the capping layer 211 is provided, it may be a material that is similar to or the same as the outer skin 10 but, due to its reduced thickness compared to the outer skin 10, allows the RF signals to be transmitted through and received by the waveguides 110, 210, 310 after passing through only a fraction of the outer skin 10 (e.g., about 0.2 mm to about 0.5 mm) than if the RF signals had to pass through the entire thickness of the outer skin 10 (e.g., about 1 inch), thereby improving RF transmission and reception through the vehicle's 1 outer skin 10.

Figure 5:
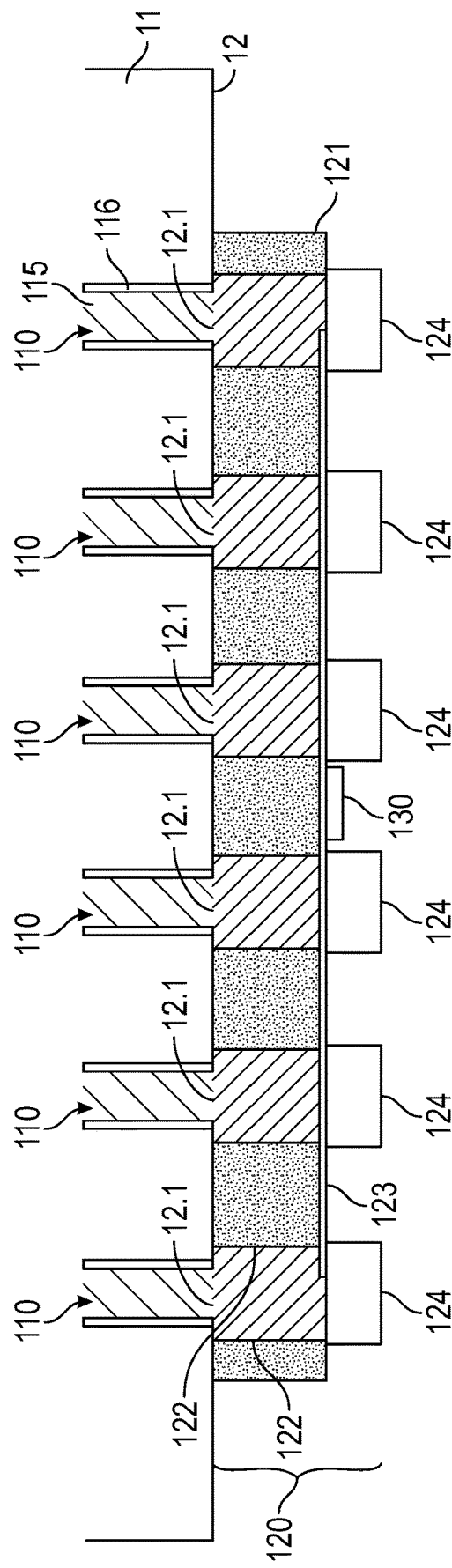
FIGS. 5-7 are cross-sectional views of input coupling layers according to embodiments of the present disclosure.
Figure 6:
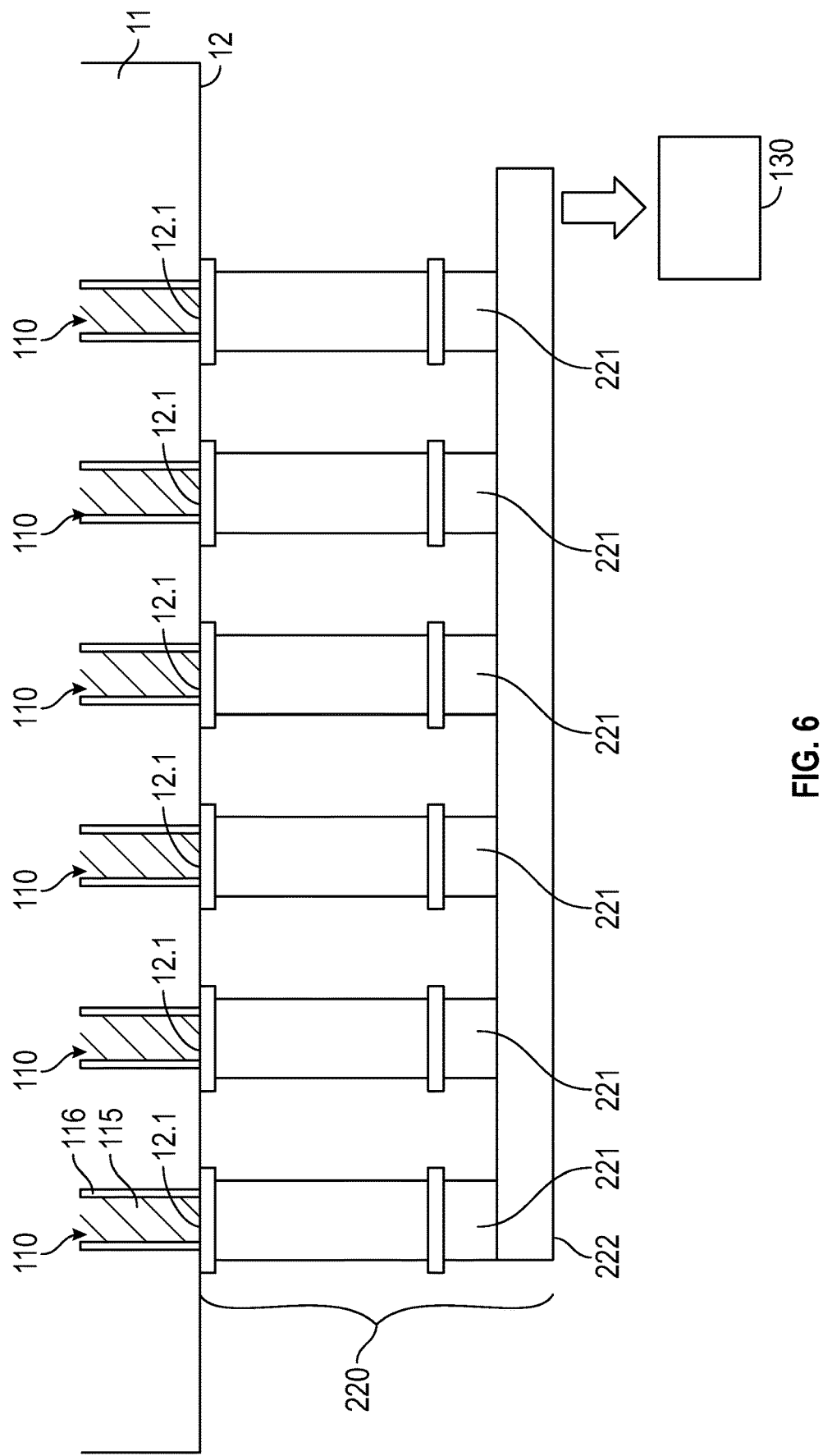
Figure 7:
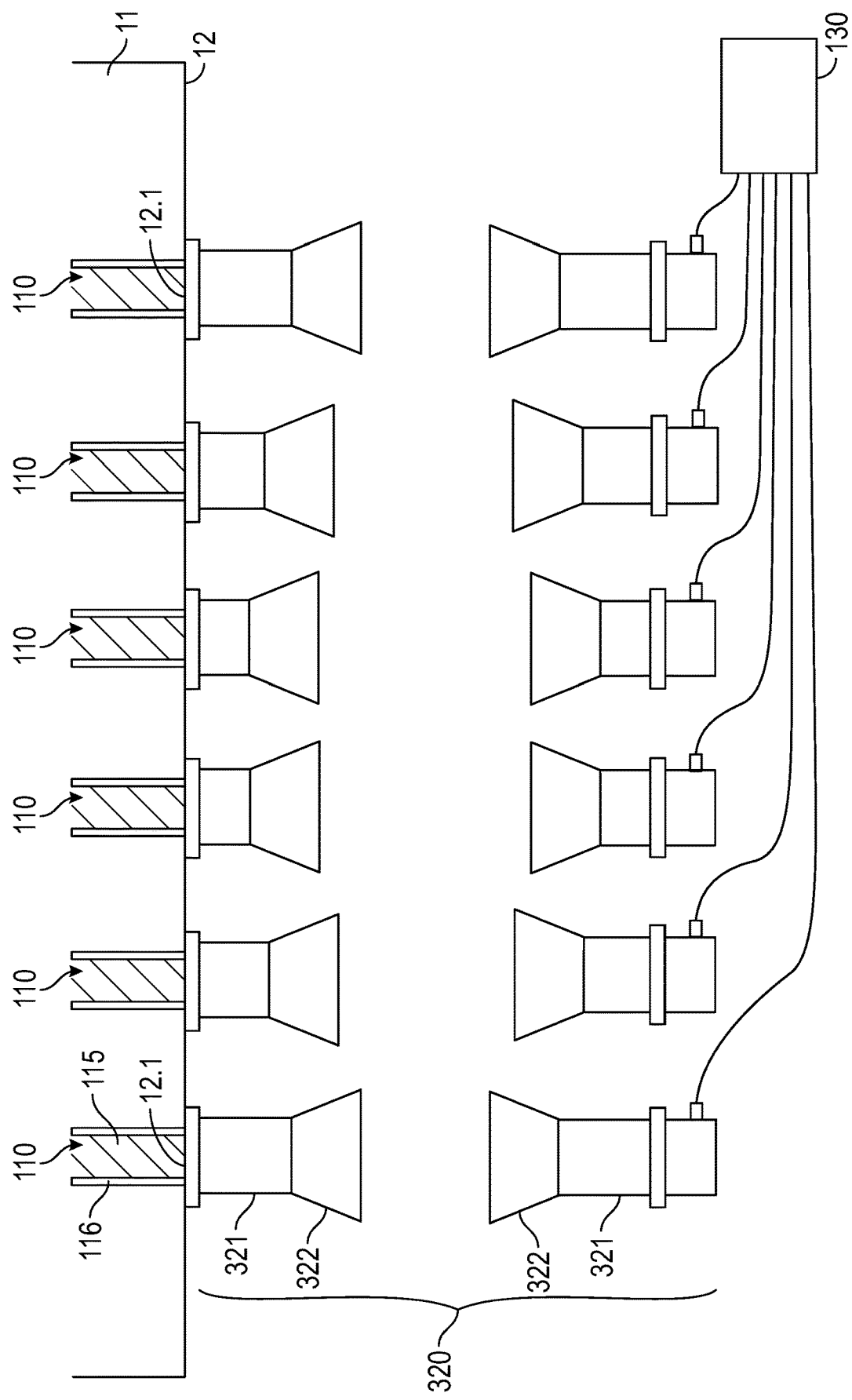

FIGS. 5-7 show different embodiments of the input coupling layer 120 described above. For convenience, FIGS. 5-7 illustrate the waveguides 110, but the input coupling layers 120, 220, 230 shown in FIGS. 5-7, respectively, are suitable for use with any of the waveguides 110, 210, 310 described herein.

Referring to FIG. 5, the input coupling layer 120 includes one or more PCB substrates 121, a plurality of via walls (or via fences) 122 through the PCB substrate 121, a plurality of microstrip lines 123, and a plurality of shorting capacitors 124. However, some embodiments may omit the shorting capacitors 124. The via walls 122 may be formed by forming openings in the layers of the PCB substrates 121 and then filling the openings with a metal. The openings in the PCB substrates 121 that form the via walls 122 may be aligned with each other or may be offset with respect to each other. The This configuration may be referred to as a PCB coupled network.

The one or more PCB substrates 121 may be a single multi-layer PCB substrate or may be a plurality of separate PCB substrates stacked on and bonded to each other. The PCB substrate 121 abuts the openings 12.1 in the metal layer 12 and is therefore open to the waveguides 110. The via walls 122 may be metal guides formed in the PCB substrate 121 that are arranged to correspond to (e.g., are aligned with) the opening 12.1 and the waveguides 110. For example, openings may be formed (e.g., drilled) into the PCB substrate 121, and the openings may then be coated with a metal to form the via walls 122. The via walls 122 ensure minimal RF signal loss through the PCB substrate 121. By including the via walls 122 in the PCB substrate 121, the waveguides 110 may be considered to extend through the PCB substrate 121 (e.g., the waveguide 110 may extend through the PCB substrate 121 via the via walls 122).

The microstrip lines 123 may be arranged on a rear surface of the PCB substrate 121 opposite to the TPS. The microstrip lines 123 may connect the waveguides 110 to the RF transceiver 130 via the via walls 122, thereby allowing transmission of RF signals to and from the various waveguides 110 from and to the RF transceiver 130. Each microstrip line 123 may have a circular waveguide transition corresponding to one of the waveguides 110 (e.g., at where the microstrip line 123 meets the PCB substrate 121). However, any suitable transition between the waveguide 110 and the microstrip line 123 may be used.

The shorting capacitors 124, when present, provide an RF short (e.g., a DC short) to terminate an RF signal passing through the waveguide 110 to prevent an RF signal from being reflected and re-transmitted out of the waveguide 110 or producing destructive interference with other RF signals.

Referring to FIG. 6, an input coupling layer 220 includes a plurality of metallic waveguides 221 that are respectively coupled to metal layer 12 and open to the waveguides 110. The metallic waveguides 221 may be fastened to the metal layer 12 via any suitable mechanism. The metallic waveguides 221 may act as extensions of the waveguides 110 and may feed into a waveguide feeding network 222.

The metallic waveguides 221 may have a size (e.g., a diameter or width) such that the characteristic impedance of the metallic waveguides 221 is equal or substantially equal to that of the waveguides 110. The metallic waveguides 221 connect the waveguides 110 to the RF transceiver 130 via a waveguide distribution network as known to those skilled in the art.

Referring to FIG. 7, an input coupling layer 320 includes waveguide adapters 321 and radiating elements (e.g., antennas) 322 opposed to each other to enable free space coupling. For example, each waveguide 110 has two corresponding waveguide adapters 321 and two corresponding radiating elements 322. Each waveguide 110 may be connected to one waveguide adapter 321, which is in turn connected to a radiating element 322. A second radiating element 322 and waveguide adapter 321 is arranged opposite to (e.g., aligned with but spaced from) the first radiating element 322 such that the waveguide 110 is free space coupled to a second waveguide adapter 321 by the radiating element 322. The second set of waveguide adapters 321 may be connected to the RF transceiver 130 via, for example, a microwave distribution technique as known in the art.

The space (e.g., the gap) between the opposing sets of radiating elements 322 may be filled by a low-loss dielectric, high temperature thermal insulation (e.g., porous aluminosilicate insulation), which can withstand high temperatures but not temperatures as high as porous carbon insulation, such as the above-discussed CalCarb® or Min-K®. Such a material is less RF opaque or lossy than porous carbon insulation, allowing for RF signals to pass therethrough without substantial loss.

It will be understood that, although the terms "first", "second", "third", etc., may be used herein to describe various elements, components, regions, layers, levels, and/or sections, these elements, components, regions, layers, levels, and/or sections should not be limited by these terms. These terms are only used to distinguish one element, component, region, layer, level, or section from another element, component, region, layer, level, or section. Thus, a first element, component, region, layer, level, or section discussed below could be termed a second element, component, region, layer, level, or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a high temperature radio frequency aperture have been described and illustrated herein, many modifications and variations within the example embodiments described herein will be apparent to those skilled in the art. Accordingly, it is to be understood that a high temperature radio frequency aperture according to the present disclosure may be embodied in forms other than as described herein without departing from the spirit and scope of the present disclosure. The present disclosure is defined by the following claims and equivalents thereof.

What is claimed is:

1. A thermal protection system comprising:
an outer skin;
a thermally insulating material under the outer skin;
a high temperature radio frequency (RF) aperture, the RF aperture comprising a plurality of waveguides separated from each other and extending through the outer skin and the thermally insulating material; and
a capping layer on the waveguides and on the outer skin, the capping layer and the outer skin being the same material.

2. The thermal protection system of claim 1, wherein each of the waveguides comprises a dielectric filler and a coating layer surrounding a periphery of the dielectric filler.

3. The thermal protection system of claim 2, wherein each of the waveguides has a base portion and an impedance transition portion, the base portion having a smaller width or diameter than that of the impedance transition portion.

4. The thermal protection system of claim 3, wherein a step-difference in the width or diameter between that of the base portion and the impedance transition portion is formed between the base portion and the impedance transition portion.

5. The thermal protection system of claim 3, wherein the impedance transition portion opens to an outer surface of the outer skin, and
wherein the base portion opens to an inner surface of the thermally insulating material.

6. The thermal protection system of claim 4, wherein a transition between the impedance transition portion and the base portion is within the outer skin.

7. The thermal protection system of claim 4, wherein a transition between the impedance transition portion and the base portion is at where the outer skin and the thermally insulating material contact each other.

8. The thermal protection system of claim 1, wherein the outer skin has a recessed portion into which the capping layer is arranged.

9. The thermal protection system of claim 1, further comprising a metal layer under the thermally insulation material.

10. The thermal protection system of claim 9, wherein the metal layer has a plurality of openings therein respectively aligned with the waveguides.

11. The thermal protection system of claim 10, wherein each of the waveguides comprises a dielectric filler and a coating layer surrounding a periphery of the dielectric filler, and
wherein the openings in the metal layer have a diameter or width corresponding to a diameter or width of the dielectric filler and smaller than a diameter or width of the coating layer.

12. A hypersonic vehicle comprising:
the thermal protection system of claim 1; and
a radar system comprising:
an RF transceiver; and
an input coupling layer,
wherein the input coupling layer connects the RF transceiver to at least some of the waveguides of the thermal protection system.

13. The hypersonic vehicle of claim 12, wherein the radar system is an electronically scanned array radar system.

14. A method of manufacturing a thermal protection system comprising a high temperature radio frequency (RF) aperture, the method comprising:
forming a plurality of openings in an outer skin;
forming a plurality of openings in a thermally insulating material;
forming waveguides in the openings in the outer skin and in the openings in the thermally insulating material, the waveguides continually extending through the outer skin and the thermally insulating material; and
forming a capping layer on the waveguides and on the outer skin, the capping layer and the outer skin being the same material.

15. The method of claim 14, further comprising arranging the thermally insulating material under the outer skin prior to the forming of the openings in the outer skin and the forming of the openings in the thermally insulating material.

16. The method of claim 14, wherein the forming of the waveguides comprises:
forming a coating layer on an inner surface of the openings in the outer skin and in the openings in the thermally insulating material; and
forming a dielectric filler in openings in the coating layers.

17. The method of claim 14, wherein the forming of the waveguides comprises:
forming a dielectric filler;
coating the dielectric filler with a coating layer to form waveguides; and
inserting the waveguides into the openings in the outer skin and into the openings in the thermally insulating material.

18. The method of claim 14, wherein the forming of the openings in the outer skin comprises:
drilling an array of first openings in the outer skin; and
re-drilling the first openings in the outer skin to form an array of second openings having a greater diameter or width than the first openings.

19. The method of claim 18, wherein the drilling the array of first openings in the outer skin comprises drilling entirely through the outer skin, and wherein the re-drilling of the first openings in the outer skin comprises re-drilling to a depth of the outer skin less than a total thickness of the outer skin.

\* \* \* \* \*